(12) United States Patent
Lee

(10) Patent No.: US 11,221,114 B2
(45) Date of Patent: Jan. 11, 2022

(54) HIGH-VOLTAGE NEON LIGHT STRING

(71) Applicant: DONGGUAN GATEWAY PLASTIC AND HARDWARE LIGHTING CO., LTD., Dongguan (CN)

(72) Inventor: James Lee, Dongguan (CN)

(73) Assignee: DONGGUAN GATEWAY PLASTIC AND HARDWARE LIGHTING CO., LTD., Dongguan (CN)

( * ) Notice: Subject to any disclaimer, the term of this patent is extended or adjusted under 35 U.S.C. 154(b) by 0 days.

(21) Appl. No.: 17/324,140

(22) Filed: May 19, 2021

(65) Prior Publication Data

US 2021/0270430 A1     Sep. 2, 2021

(51) Int. Cl.
| | |
|---|---|
| *F21S 4/10* | (2016.01) |
| *F21S 4/28* | (2016.01) |
| *H05B 45/20* | (2020.01) |
| *F21V 23/02* | (2006.01) |
| *H05B 47/19* | (2020.01) |
| *H05B 45/10* | (2020.01) |
| *H05B 45/375* | (2020.01) |
| *F21Y 115/10* | (2016.01) |

(52) U.S. Cl.
CPC . *F21S 4/10* (2016.01); *F21S 4/28* (2016.01); *F21V 23/02* (2013.01); *H05B 45/10* (2020.01); *H05B 45/20* (2020.01); *H05B 45/375* (2020.01); *H05B 47/19* (2020.01); *F21Y 2115/10* (2016.08)

(58) Field of Classification Search
CPC .... F21S 4/10; F21S 4/28; H05B 47/19; H05B 45/10; H05B 45/375; H05B 45/20; F21V 23/02; F21Y 2115/10
See application file for complete search history.

(56) References Cited

U.S. PATENT DOCUMENTS

| | | | |
|---|---|---|---|
| 10,731,831 B2 * | 8/2020 | Chang | F21S 4/10 |
| 2014/0334648 A1 * | 11/2014 | Wang | H05B 47/195 381/150 |
| 2017/0102114 A1 * | 4/2017 | Xiong | F21K 9/278 |
| 2019/0098725 A1 * | 3/2019 | Sadwick | H05B 45/20 |

* cited by examiner

*Primary Examiner* — Minh D A

(57) ABSTRACT

The present invention relates to the field of neon lights, and in particular to a high-voltage neon light string. The high-voltage neon light string of the present invention is formed by connecting a controller and a plurality of light bars end to end. The number of light bars connected is determined according to a user's needs, and it is convenient for assembly and disassembly. The user can control a transmitter by keys or wirelessly to send signals with different pulse widths to the light bars, and LED units on the light bars receive the input signals and then display different colors according to data of the signals.

8 Claims, 3 Drawing Sheets

HIGH-VOLTAGE NEON LIGHT STRING

TECHNICAL FIELD

The present invention relates to the field of neon lights, and in particular to a high-voltage neon light string.

BACKGROUND

Light strings, such as Christmas light strings, landscape light strings and building light strings, have been widely used. With the progress of light-emitting diode (LED) technologies and the reduction of price, the application of LEDs in light strings has become a new trend. However, since LEDs are basically suitable for FBR DC power supplies and light strings are applied in AC power supply environments, in some products in the market, LEDs have been applied in light strings. LED digital light strings adopts a new structure and a specific technology, and their main bodies are formed by connecting high-brightness light-emitting diodes (LED) through a special patented structure by using a particular optical technology and a specific coating design. The LED digital light strings are mainly characterized by energy saving, environmental friendliness, shock resistance and water resistance, and have the most prominent characteristics of uniform illumination and illumination at 360 degrees on the whole body. Moreover, luminous points of the LEDs are invisible from the outside in the operating state, which is exactly the same as the luminous effect of conventional neon lights.

However, how to control and regulate LEDs to display different colors and how to assemble and disassemble light bars more conveniently according to actual needs are obstacles to be overcome.

SUMMARY

To solve the above problems, the present invention provides a high-voltage neon light string.

To achieve the above objective, the present invention adopts the following technical solutions. A high-voltage neon light string is provided, including a plurality of light bars and a controller, the light bars being connected end to end, one end of the controller being connected to a power plug while the other end of the controller being electrically connected to the light bars, wherein the controller includes an AC-DC rectifier and filter circuit, a DC-DC voltage step-down and stabilizer circuit, a zero-cross signal detection circuit and a control circuit; after the controller is connected to a power supply, the AC-DC rectifier and filter circuit converts AC into high-voltage DC to supply power to the light bars, the DC-DC voltage step-down and stabilizer circuit supplies power to the control circuit, and the control circuit is controlled wirelessly or by keys to send signals with different pulse widths to the light bars so as to drive the light bars, and the zero-cross signal detection circuit is configured to perform power failure detection or time counting; each of the light bars includes a power signal input circuit and an LED display circuit; and after the light bars are connected to the controller, the power signal input circuits receive the signals send by the controller, and the LED display circuits display different colors according to data of the signals.

Further, the AC-DC rectifier and filter circuit includes a live wire (L) input terminal, a null wire (N) input terminal and an MSB40M chip Z1; a capacitor C5 is connected between the L input terminal and the N input terminal; the L input terminal and the N input terminal are connected to an AC terminal of the chip Z1, respectively; the L input terminal is further connected to the zero-cross signal detection circuit through a fuse F2; and an anode (+) output terminal and a cathode (−) output terminal of the chip Z1 are connected to the DC-DC voltage step-down and stabilizer circuit, respectively, and a capacitor EC1 and a capacitor EC2 are further connected in parallel between the anode (+) output terminal and the cathode (−) output terminal.

Further, the zero-cross signal detection circuit includes a resistor R1, a resistor R5, a resistor R6 and a diode D4; the L input terminal is connected to a common terminal GND through the resistor R1, the resistor R5 and the resistor R6 successively; and the diode D4 is connected in parallel at two ends of the resistor R6.

Further, the DC-DC voltage step-down and stabilizer circuit adopts an FT8430 chip U1; a D terminal of the chip U1 is connected to the anode (+) output terminal of the chip, and is further connected to a resistor R2, a resistor R3 and a resistor R7 which are connected in parallel; other ends of the resistor R2, the resistor R3 and the resistor R7 connected in parallel are connected to a +5V voltage, and the +5V voltage is connected to the common terminal GND through a diode D2; a VCC terminal of the chip U1 is connected to a +5V voltage through an inductor L1, and the +5V voltage is connected to the common terminal GND through a resistor R4; the VCC terminal of the chip U1 is further connected to the common terminal GND through a diode D6; a GND terminal of the chip U1 is connected to the common terminal GND through a diode D5 and a capacitor C7; and a capacitor C6 is further connected between the VCC terminal and the GND terminal of the chip.

Further, the control circuit includes a main control module, a key module and a wireless control module, and adopts an HTS1582D chip U2; a K1 terminal of the chip U2 is connected to the key module, a CS terminal of the chip U2 is connected to the wireless control module, a VR terminal of the chip U2 is connected to the zero-cross signal detection circuit, and a VSS terminal of the chip U2 is connected to the common terminal GND; a T2 terminal of the chip U2 is connected to a DL breaker H1, and a VDD terminal of the chip U2 is connected to a +5V voltage; the +5V voltage is connected to the common terminal GND through a capacitor C2; the VDD terminal of the chip U2 is further connected to the common terminal GND through a capacitor C1; and a LED_O terminal of the chip U2 is connected to the power signal input circuits and the LED display circuits of the light bars through a resistor R10, and is grounded through a diode D3.

The CS terminal of the chip U2 is further connected to an OUT terminal of an IRM8601 chip IR1; a VCC terminal of the chip IR1 is connected to the breaker H1 and further connected to a +5V voltage; a GND terminal of the chip IR1 is connected to the common terminal GND; and a capacitor C4 and a capacitor C3 are connected in parallel between the VCC terminal and the GND terminal of the chip IR1.

The wireless control module adopts a 2150LB chip U3; a DOUT terminal of the chip U3 is connected to the CS terminal of the chip U2, and an XIN terminal of the chip U2 is connected to the common terminal GND through a crystal oscillator; the VDD terminal of the chip U2 is connected to a +5V voltage through a diode D7, the GND terminal of the chip U2 is connected to the common terminal GND, and a capacitor C8 and a capacitor C9 are further connected in parallel between the VDD terminal and the GND terminal of the chip U2; and an RFIN terminal of the chip U3 is connected to the power signal input circuits through a capacitor C10, and the RFIN terminal is further connected to the common terminal GND through an inductor L2.

Further, a threaded connector is provided at one end of each of the light bars, and a threaded nipple is provided at the other end of each of the light bars; the light bars are screwed by the threaded connectors and the threaded nipples; plugs and sockets that are electrically connected to the LED units on the light bars are provided inside the threaded connectors and the threaded nipples, respectively; and, when the threaded connectors are screwed to the threaded nipples, the plugs are electrically connected to the sockets, and the controller is screwed and electrically connected to the threaded connectors of the light bars through threaded ports.

The present invention has the following beneficial effects. The high-voltage neon light string of the present invention is formed by connecting a controller and a plurality of light bars end to end. The number of light bars connected is determined according to a user's needs, so the practicability is high. Moreover, there are threaded connections between the controller and the first light bar and between light bars, so it is convenient for assembly and disassembly.

The controller mainly consists of four parts, i.e., an AC-DC rectifier and filter circuit, a DC-DC voltage step-down and stabilizer circuit, a zero-cross signal detection circuit and a control circuit, and the control circuit includes a key module and a wireless control mode. Thus, the user can control a transmitter by keys or wirelessly to send signals with different pulse widths to the light bars so as to drive LED units on the light bars, and the LED units on the light bars receive the input signals and then display different colors according to data of the signals.

Figure 1:
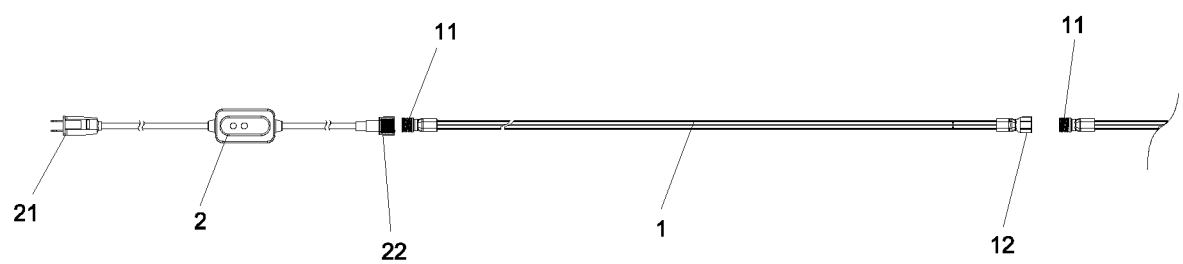
FIG. 1 is a schematic structure diagram according to this embodiment.

REFERENCE NUMERALS 1. light bar; 11. threaded connector; 12. threaded nipple; 13. LED unit; 15. power signal input circuit; 16. LED display circuit; 2. controller; 21. power plug; 22. threaded port; 23. AC-DC rectifier and filter circuit; 24. DC-DC voltage step-down and stabilizer circuit; 25. zero-cross signal detection circuit; 26. control circuit; 261. main control module; 262. key module; 263. wireless control module.

DETAILED DESCRIPTION

The present invention will be further described below in detail by specific implementations with reference to the accompanying drawings. The present application may be implemented in various different forms, and is not limited to the implementations described in this embodiment. The following specific implementations are provided to understand the disclosure of the present application more clearly and thoroughly. The words indicating orientation, such as upper, lower, left and right, are merely for describing the position of the shown structure in the corresponding drawing.

Figure 2:
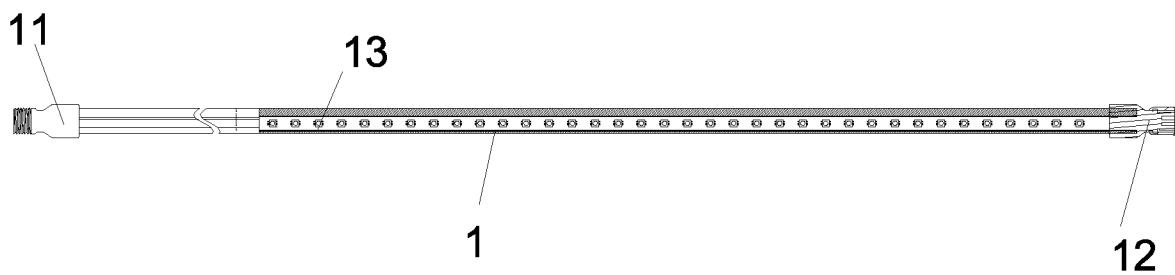
FIG. 2 is a sectional view of a light bar according to this embodiment.

With reference to FIGS. 1-2, the present invention relates to a high-voltage neon light string, including a plurality of light bars 1 and a controller 2. The light bars 1 may be connected end to end. One end of the controller 2 is connected to a power plug 21, while the other end of the controller 2 is electrically connected to the light bars 1. A threaded connector 11 is provided at one end of each of the light bars 1, and a threaded nipple 12 is provided at the other end of each of the light bars 1. The light bars 1 are screwed by the threaded connectors 11 and the threaded nipples 12, respectively. Plugs and sockets that are electrically connected to LED units 13 on the light bars 1 are provided inside the threaded connectors 11 and the threaded nipples 12, respectively. When the threaded connectors 11 are screwed to the threaded nipples 12, the plugs are electrically connected to the sockets, and the controller is screwed and electrically connected to the threaded connectors 11 of the light bars 1 through threaded ports 22.

Figure 3:
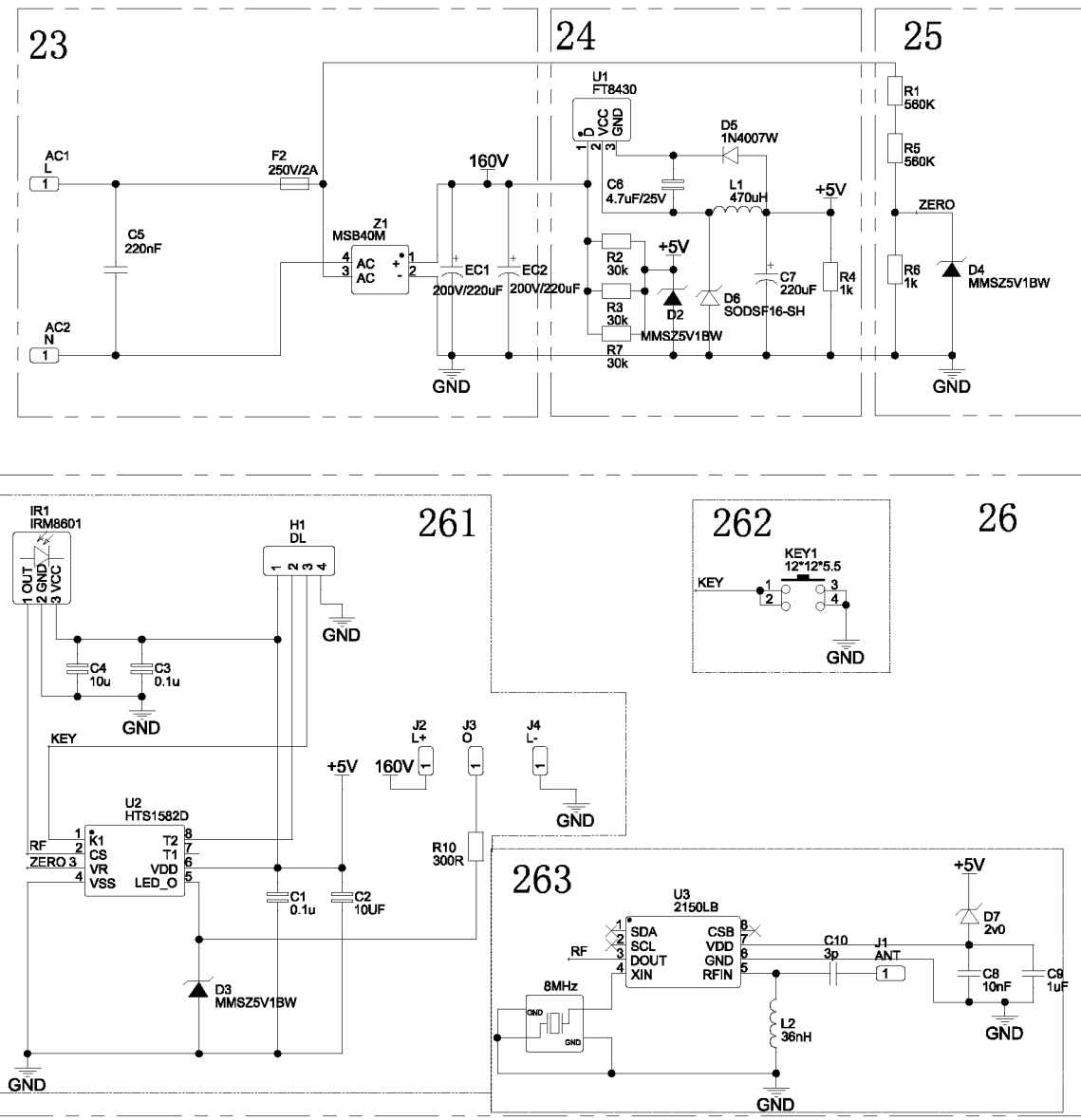
FIG. 3 is a schematic circuit diagram of a controller according to this embodiment.
Figure 4:
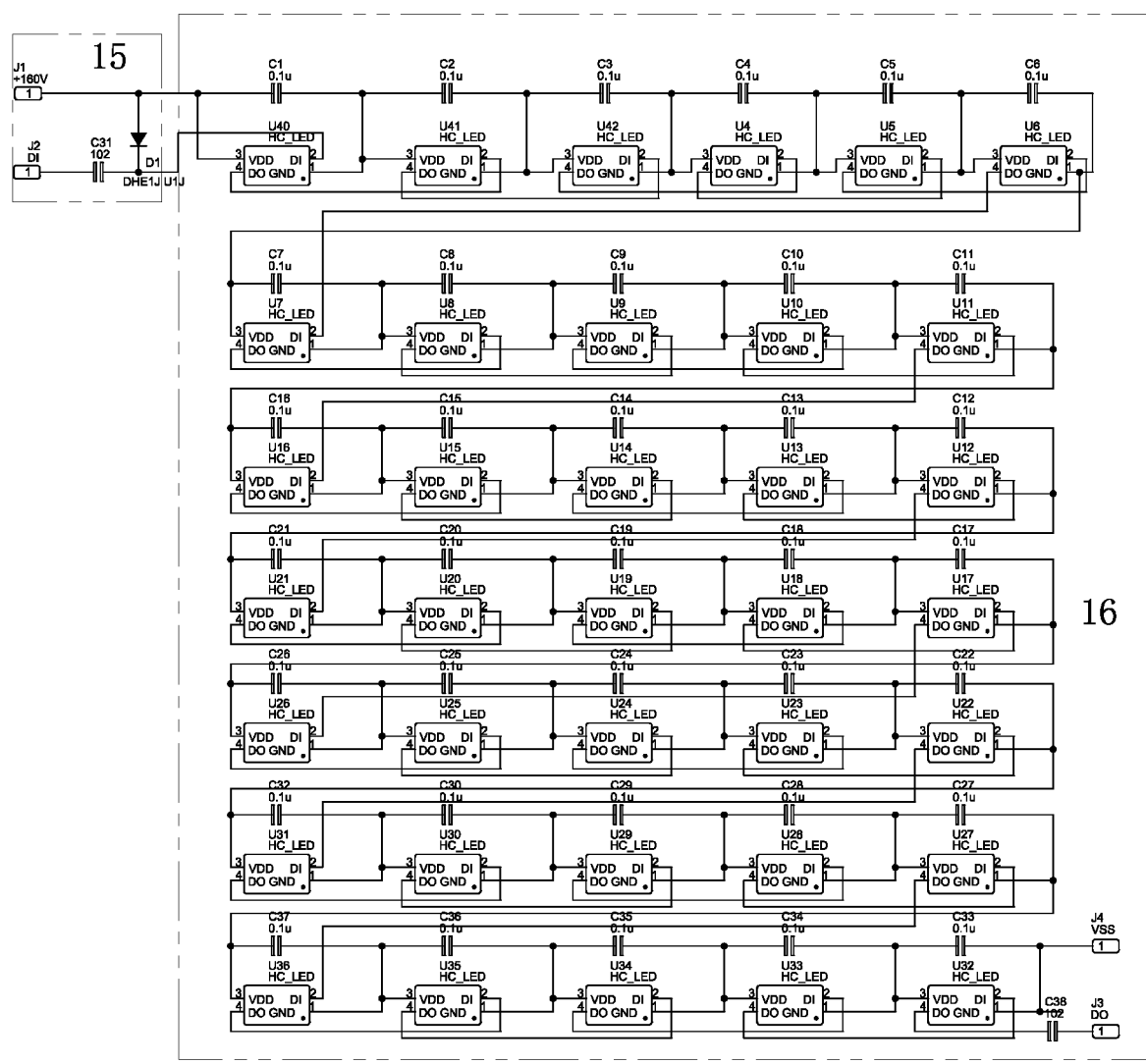
FIG. 4 is a schematic circuit diagram of light bars according to this embodiment.

With reference to FIGS. 3-4, in this embodiment, the controller 2 includes an AC-DC rectifier and filter circuit 23, a DC-DC voltage step-down and stabilizer circuit 24, a zero-cross signal detection circuit 25 and a control circuit 26. After the controller 2 is connected to a power supply, the AC-DC rectifier and filter circuit 23 converts AC into high-voltage DC to supply power to the light bars 1, the DC-DC voltage step-down and stabilizer circuit 24 supplies power to the control circuit 26, and the control circuit 26 is controlled wirelessly or by keys to send signals with different pulse widths to the light bars 1 so as to drive the light bars 1 to emit light. The zero-cross signal detection circuit 25 is configured to perform power failure detection or time counting. Each of the light bars 1 includes a power signal input circuit 15 and an LED display circuit 16. After the light bars 1 are connected to the controller 2, the power signal input circuits 15 receive the signals send by the controller 2, and the LED display circuits 16 display different colors according to data of the signals.

In this embodiment, the AC-DC rectifier and filter circuit 23 includes a live wire (L) input terminal, a null wire (N) input terminal and an MSB40M chip Z1. A capacitor C5 is connected between the L input terminal and the N input terminal. The L input terminal and the N input terminal are connected to an AC terminal of the chip Z1, respectively. The L input terminal is further connected to a resistor R1 in the zero-cross signal detection circuit 25 through a fuse F2. An anode (+) output terminal and a cathode (−) output terminal of the chip Z1 are connected to a D terminal of the DC-DC voltage step-down and stabilizer circuit 24, respectively, and a capacitor EC1 and a capacitor EC2 are further connected in parallel between the anode (+) output terminal and the cathode (−) output terminal. Here, the power supply at the anode (+) output terminal of the chip Z1 is 160V, and is connected to a J1 terminal of the power signal input circuit 15.

In this embodiment, the zero-cross signal detection circuit 25 includes a resistor R1, a resistor R5, a resistor R6 and a diode D4. The L input terminal is connected to a common terminal GND through the resistor R1, the resistor R5 and the resistor R6 successively. The diode D4 is connected in parallel at two ends of the resistor R6. Here, the model of the diode D4 is MMSZSV1BW. A VR terminal with the chip U2 is reserved between the resistor R5 and the resistor R6.

In this embodiment, the DC-DC voltage step-down and stabilizer circuit 24 adopts an FT8430 chip U1. A D terminal of the chip U1 is connected to the anode (+) output terminal of the chip, and is further connected to a resistor R2, a resistor R3 and a resistor R7 which are connected in parallel.

Other ends of the resistor R2, the resistor R3 and the resistor R7 connected in parallel are connected to a +5V voltage, and the +5V voltage is connected to the common terminal GND through a diode D2. A VCC terminal of the chip U1 is connected to a +5V voltage through an inductor L1, and the +5V voltage is connected to the common terminal GND through a resistor R4. The VCC terminal of the chip U1 is further connected to the common terminal GND through a diode D6. A GND terminal of the chip U1 is connected to the common terminal GND through a diode D5 and a capacitor C7. A capacitor C6 is further connected between the VCC terminal and the GND terminal of the chip. Here, the model of the diode D5 is 1N4007 W, the model of the diode D2 is MMSZ5V1BW, and the model of the diode D6 is SODSF16-SH.

In this embodiment, the control circuit 26 includes a main control module 261, a key module 262 and a wireless control module 263, and adopts an HTS1582D chip U2. A KI terminal of the chip U2 is connected to the key module 262, a CS terminal of the chip U2 is connected to the wireless control module 263, a VR terminal of the chip U2 is connected between the resistor R5 and the resistor R6 in the zero-cross signal detection circuit 25, and a VSS terminal of the chip U2 is connected to the common terminal GND. A T2 terminal of the chip U2 is connected to a DL breaker H1, and a VDD terminal of the chip U2 is connected to a +5V voltage. The +5V voltage is connected to the common terminal GND through a capacitor C2. The VDD terminal of the chip U2 is further connected to the common terminal GND through a capacitor C1. A LED_O terminal of the chip U2 is connected to the power signal input circuits and the LED display circuits of the light bars through a resistor R10, and is grounded through a diode D3. Here, the model of the diode D3 is MMSZ5V1BW. The CS terminal of the chip U2 is further connected to an OUT terminal of an IRM8601 chip IR1. A VCC terminal of the chip IR1 is connected to the breaker H1 and further connected to a +5V voltage, and a GND terminal of the chip IR1 is connected to the common terminal GND. A capacitor C4 and a capacitor C3 are connected in parallel between the VCC terminal and the GND terminal of the chip IR1. In addition, the wireless control module adopts a 2150LB chip U3. A DOUT terminal of the chip U3 is connected to the CS terminal of the chip U2, and an XIN terminal the chip U3 is connected to the common terminal GND through a crystal oscillator. The VDD terminal of the chip U2 is connected to a +5V voltage through a diode D7, the GND terminal of the chip U2 is connected to the common terminal GND, and a capacitor C8 and a capacitor C9 are further connected in parallel between the VDD terminal and the GND terminal of the chip U2. An RFIN terminal of the chip U3 is connected to the power signal input circuits 15J1 through a capacitor C10, and the RFIN terminal is further connected to the common terminal GND through an inductor L2.

In this embodiment, when in use, after the controller 2 is connected to a power supply, the AC-DC rectifier and filter circuit converts AC 120V/60 HZ power into 160V-DC power to supply power to the LED light bars 1, the DC-DC voltage step-down and stabilizer circuit 24 supplies power to the MCU (chip U2), and the controller circuit 26 is controlled wirelessly or by keys to send signals with different pulse widths to the light bars 1 so as to drive the LED units 13. The zero-cross signal detection circuit 25 is configured to perform power failure detection or time counting. After the light bars 1 are connected to the controller 3, signals are input at J2 terminals of the power signal input circuits 15, and the LED display circuits 16 receive the input signals and then display different colors according to data of the signals.

It is to be further noted, unless otherwise explicitly specified and defined, the terms "connect", "fix", "arrange" and the like should be interpreted in a broad sense; and for a person of ordinary skill in the art, the specific meanings of the terms in the present invention can be interpreted according to specific conditions.

The foregoing implementations are merely preferred implementations of the present invention and not intended to limit the scope of the present invention. Various variations and improvements made to the technical solutions of the present invention by a person of ordinary skill in the art without departing from the design spirit of the present invention shall fall into the protection scope defined by the appended claims of the present invention.

The invention claimed is:

1. A high-voltage neon light string, comprising a plurality of light bars and a controller, the light bars being connected end to end, one end of the controller being connected to a power plug while the other end of the controller being electrically connected to the light bars, wherein the controller comprises an AC-DC rectifier and filter circuit, a DC-DC voltage step-down and stabilizer circuit, a zero-cross signal detection circuit and a control circuit; after the controller is connected to a power supply, the AC-DC rectifier and filter circuit converts AC into high-voltage DC to supply power to the light bars, the DC-DC voltage step-down and stabilizer circuit supplies power to the control circuit, and the control circuit is controlled wirelessly or by keys to send signals with different pulse widths to the light bars so as to drive the light bars; the zero-cross signal detection circuit is configured to perform power failure detection or time counting; each of the light bars comprises a power signal input circuit and an LED display circuit; and after the light bars are connected to the controller, the power signal input circuits receive the signals send by the controller, and the LED display circuits display different colors according to data of the signals.

2. The high-voltage neon light string according to claim 1, wherein the AC-DC rectifier and filter circuit comprises a live wire (L) input terminal, a null wire (N) input terminal and an MSB40M chip Z1; a capacitor C5 is connected between the L input terminal and the N input terminal; the L input terminal and the N input terminal are connected to an AC terminal of the chip Z1, respectively; the L input terminal is further connected to the zero-cross signal detection circuit through a fuse F2; and an anode (+) output terminal and a cathode (−) output terminal of the chip Z1 are connected to the DC-DC voltage step-down and stabilizer circuit, respectively, and a capacitor EC1 and a capacitor EC2 are further connected in parallel between the anode (+) output terminal and the cathode (−) output terminal.

3. The high-voltage neon light string according to claim 2, wherein the zero-cross signal detection circuit comprises a resistor R1, a resistor R5, a resistor R6 and a diode D4; the L input terminal is connected to a common terminal GND through the resistor R1, the resistor R5 and the resistor R6 successively; and the diode D4 is connected in parallel at two ends of the resistor R6.

4. The high-voltage neon light string according to claim 2, wherein the DC-DC voltage step-down and stabilizer circuit adopts an FT8430 chip U1; a D terminal of the chip U1 is connected to the anode (+) output terminal of the chip, and is further connected to a resistor R2, a resistor R3 and a resistor R7 which are connected in parallel; other ends of the resistor R2, the resistor R3 and the resistor R7 connected in parallel are connected to a +5V voltage, and the +5V voltage is connected to the common terminal GND through a diode D2; a VCC terminal of the chip U1 is connected to a +5V voltage through an inductor L1, and the +5V voltage is connected to the common terminal GND through a resistor R4; the VCC terminal of the chip U1 is further connected to the common terminal GND through a diode D6; a GND terminal of the chip U1 is connected to the common terminal GND through a diode D5 and a capacitor C7; and a capacitor C6 is further connected between the VCC terminal and the GND terminal of the chip.

5. The high-voltage neon light string according to claim 2, wherein the control circuit comprises a main control module, a key module and a wireless control module, and adopts an HTS1582D chip U2; a K1 terminal of the chip U2 is connected to the key module, a CS terminal the chip U2 is connected to the wireless control module, a VR terminal the chip U2 is connected to the zero-cross signal detection circuit, and a VSS terminal the chip U2 is connected to the common terminal GND; a T2 terminal of the chip U2 is connected to a DL breaker H1, and a VDD terminal the chip U2 is connected to a +5V voltage; the +5V voltage is connected to the common terminal GND through a capacitor C2; the VDD terminal of the chip U2 is further connected to the common terminal GND through a capacitor C1; and a LED_O terminal of the chip U2 is connected to the power signal input circuits and the LED display circuits of the light bars through a resistor R10, and is grounded through a diode D3.

6. The high-voltage neon light string according to claim 5, wherein the CS terminal of the chip U2 is further connected to an OUT terminal of an IRM8601 chip IR1; a VCC terminal of the chip IR1 is connected to the breaker H1 and further connected to a +5V voltage; a GND terminal of the chip IR1 is connected to the common terminal GND; and a capacitor C4 and a capacitor C3 are connected in parallel between the VCC terminal and the GND terminal of the chip IR1.

7. The high-voltage neon light string according to claim 5, wherein the wireless control module adopts a 2150LB chip U3; a DOUT terminal of the chip U3 is connected to the CS terminal of the chip U2, and an XIN terminal the chip U2 is connected to the common terminal GND through a crystal oscillator; the VDD terminal of the chip U2 is connected to a +5V voltage through a diode D7, the GND terminal of the chip U2 is connected to the common terminal GND, and a capacitor C8 and a capacitor C9 are further connected in parallel between the VDD terminal and the GND terminal of the chip U2; and an REIN terminal of the chip U3 is connected to the power signal input circuits through a capacitor C10, and the REIN terminal is further connected to the common terminal GND through an inductor L2.

8. The high-voltage neon light string according to claim 1, wherein a threaded connector is provided at one end of each of the light bars, and a threaded nipple is provided at the other end of each of the light bars; the light bars are screwed by the threaded connectors and the threaded nipples; plugs and sockets that are electrically connected to the LED units on the light bars are provided inside the threaded connectors and the threaded nipples, respectively; and, when the threaded connectors are screwed to the threaded nipples, the plugs are electrically connected to the sockets, and the controller is screwed and electrically connected to the threaded connectors of the light bars through threaded ports.

* * * * *